April 28, 1959     H. A. HARVEY     2,884,570
ELECTRIC CONTROL CIRCUIT
Filed Sept. 2, 1953
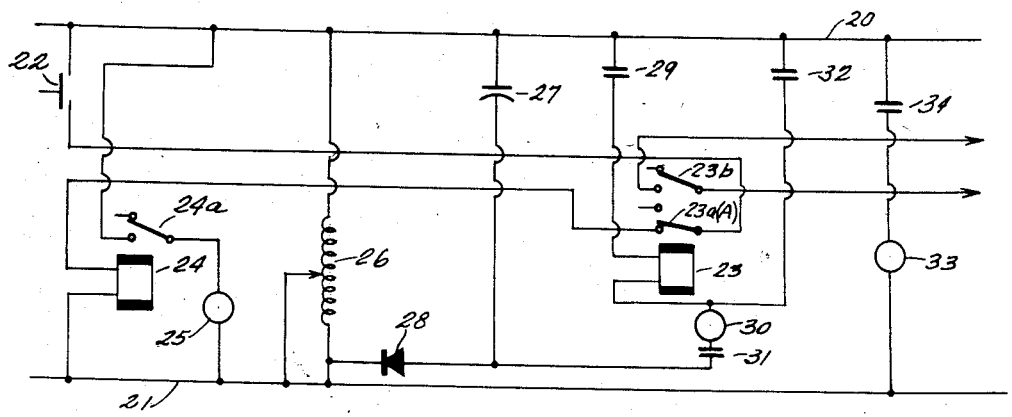
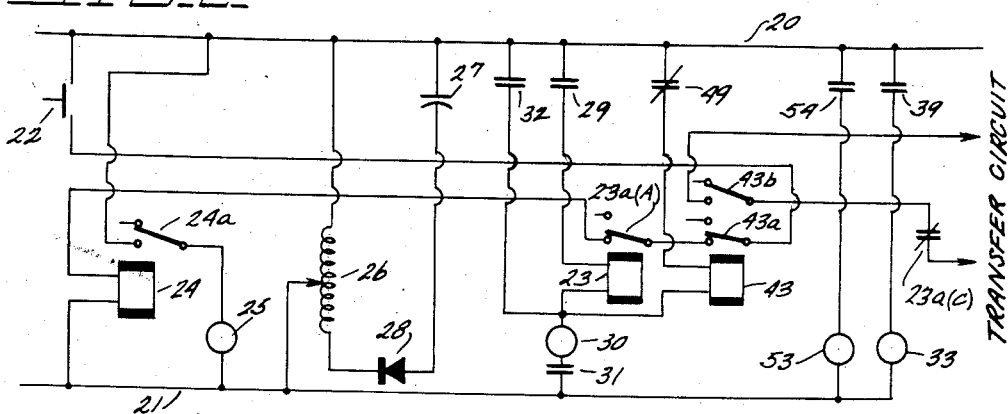
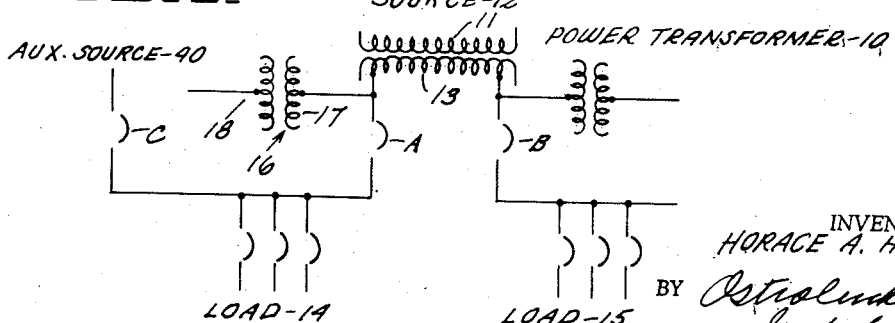
INVENTOR.
HORACE A. HARVEY
BY *Ostrolenk, Faber,*
*Gerb & Soffen*
ATTORNEYS

United States Patent Office 2,884,570
Patented Apr. 28, 1959

2,884,570

ELECTRIC CONTROL CIRCUIT

Horace A. Harvey, Trevose, Pa., assignor to I-T-E Circuit Breaker Company, Philadelphia, Pa., a corporation of Pennsylvania Application September 2, 1953, Serial No. 378,026

9 Claims. (Cl. 317—60)

My invention relates to electric control circuits for circuit breakers and is more particularly directed to novel circuitry which will insure the operation of both the circuit breaker trip coil and trip auxiliary relay operating coil when tripping power is obtained from a charged capacitor.

In the operation of automatic circuit breaker interrupting equipment, it is frequently desirable to interrupt the circuit even though a fault condition does not exist thereon. Hence, a trip coil is usually provided which can be either energized as a result of over current-under voltage or intentionally energized by a lineman.

When a circuit breaker is coordinated with other circuit breakers in a system, it is also frequently desirable to initiate a second operation when a first circuit breaker opens. Thus, for example, in some instances, it is desirable that an alarm will ring to appraise personnel that a circuit breaker is open. Also, in some instances, for example, when the fault current exists at a load fed by two lines to be protected by a circuit breaker, it is desirable to provide means to automatically trip a second circuit breaker in the event the first circuit breaker should automatically trip.

In still other applications, it is essential to provide a transfer circuit whereby a second circuit breaker will be automatically closed or prepared to be closed in the event a first circuit breaker is automatically opened.

In still further applications, the circuitry is designed so that auxiliary means will provide a lockout for the circuit breaker being opened or for a second circuit breaker in the event of the opening of a first circuit breaker.

The auxiliary circuits, above mentioned, which are rendered operative upon the opening of a first breaker are old and well known in the art.

Heretofore, it has been the practice to provide a trip auxiliary relay operating coil in parallel with the secondary winding of a control power transformer.

The trip auxiliary relay operating coil is shunted by a set of contacts which remain open whenever normal current is flowing in the circuit.

During the normal operation of the circuit breaker, the trip auxiliary relay operating coil is energized. However, on the occurrence of a fault, the contact shunting this operating coil is closed when the protective relay operates and hence, the trip auxiliary relay operating coil is deenergized due to the shunting of the coil through the short circuit path to thereby operate one or more of the above mentioned auxiliary circuits. However, this scheme used in the prior art has several disadvantages.

The main disadvantage of this system is that in the event that the line voltage should drop or dip, the auxiliary trip relay may drop out even though the circuit breaker with which it is associated remains in the closed position. Hence, the auxiliary circuits will be energized even though the circuit breaker is not opened.

It is one object of my invention to provide a novel control circuit wherein the auxiliary circuits will be operative only when the circuit breaker opens and the trip auxiliary operating relay coil will not be affected by a drop or dip in the line voltage unless the circuit breaker opens.

A further disadvantage of the prior art arrangement is that the protective relay could not be a standard device since it required an extra set of contacts which were used to shunt the trip auxiliary operating coil, as above mentioned.

A further object of my invention is therefore to provide a novel arrangement whereby a standard protective relay may be employed.

Still another disadvantage of the above mentioned prior art arrangement is that the trip auxiliary relay control coil is continuously energized thereby creating a conditions whereby this coil may possibly burn out.

With my novel circuitry, I provide an arrangement in which the trip auxiliary relay operating coil is energized only when the circuit breaker opens and is normally deenergized when the cooperating contacts of the circuit breaker are in the engaged position.

With my novel circuit, I position the trip auxiliary relay operating coil in series with the trip coil.

The circuit breaker trip capacitor is connected in parallel with the series circuit of the trip auxiliary relay coil and the trip coil. Thus, whenever the circuit breaker opens and the tripping capacitor is allowed to discharge, it will serve as a source of energy for both the circuit breaker trip coil and the trip auxiliary relay operating coil. Thus, it will be seen that the trip auxiliary operating coil is only energized if the circuit breaker opens, is not shunted by a set of auxiliary contacts operating from the protective relay and is independent of a drop or dip in the line voltage.

In a modification of my invention, I provide an under voltage and overcurrent trip auxiliary relay coil which are connected in parallel. The circuitry is so arranged that a transfer circuit is inoperative when the main circuit breaker is opened as a result of an overcurrent. However, if the circuit breaker is opened as a result of an under voltage, then the transfer circuit is rendered operative. Thus, by providing an under voltage trip auxiliary relay operating coil in parallel with an overcurrent trip auxiliary operating coil, I can provide a safety means for the circuit breaker in which the transfer circuit is operative or inoperative depending upon the condition which caused the opening of the circuit breaker.

An object of my invention is to provide an electric control circuit for circuit breaker in which the operation of the overcurrent auxiliary circuit is independent of a drop or dip of the line voltage and will function only when the circuit breaker is opened as a result of overcurrent conditions.

Another object of my invention is to provide a circuit arrangement in which the transfer circuit will be operative or inoperative depending upon the conditions which caused the opening of the circuit breaker.

A still further object of my invention is to provide an electrical control circuit wherein the trip coil and trip auxiliary relay operating coil are connected in series with each other and in parallel with a circuit breaker trip capacitor.

These and other objects of my invention will be apparent from the following description when taken in connection with the drawings in which:

Figure 1 is a circuit diagram schematically illustrating overcurrent lockout relay with electrical reset in the closing control circuit of a circuit breaker.

Figure 2 is a circuit diagram similar to Figure 1 and illustrates a modification of my invention showing a transfer circuit which is rendered operative or inoperative depending upon the condition which causes the opening of the circuit breaker.

Figure 3 is a single line diagram illustrating the manner in which protective equipment may be connected between the lines in the source and the load and is typical representation of the arrangement to which my invention is adaptable.

Referring now to the single line diagram of Figure 3, I have shown a power transformer 10 having primary winding 11 connected to the source 12 and a secondary winding 13.

Circuit breakers A and B are connected to the secondary winding 13 and protect the lines to the loads 14 and 15. The circuit breakers A and B to which my invention is particularly adaptable is shown in Patent No. 2,769,057 issued October 30, 1956, assigned to the assignee of the instant invention.

A control power transformer 16, having primary winding 17 and secondary winding 18, is connected to the source side of the circuit breaker A. The overcurrent tripping circuit connected to the secondary winding 18 of the control power transformer 16 is also connected to the trip coil of the circuit breaker A; the closing control circuit of the circuit breaker A, illustrated in Figures 1 and 2, is connected to the secondary winding 18 of the control power transformer 16.

Thus, it will be apparent that the electrical control circuit of my invention may be continuously energized even though the circuit breaker A is opened.

It will be noted that the circuit breaker B is also provided with a control power transformer and appropriate circuitry, as above described in connection with circuit breaker A.

Referring now to Figure 1, lines 20 and 21 are connected to the secondary winding 18 of the control power transformer 16, illustrated in the single line diagram of Figure 3. The circuit breaker manual closing switch 22 is connected in series with the trip auxiliary relay contacts 23a and the circuit breaker closing relay coil 24. The trip auxiliary relay contacts 23a are normally closed. The contacts 23a are associated with the trip auxiliary relay operating coil 23, as will hereinafter be more fully described. The normally closed contacts 23a are moved to the open position whenever the trip auxiliary relay operating coil 23 is energized. However, when the circuit breaker A is fully opened and the coil 23 is not energized or a reset circuit has been operated, the contacts 23a will assume their normally closed position, thereby enabling the closing of the circuit breaker upon the movement of the closing switch 22 to the closed position.

Circuit breaker closing relay contacts 24a are connected in series with the circuit breaker closing coil 25. This series combination of closing relay contacts 24a and closing coil 25 is connected in parallel with the series combination of the manual closing switch 22, the trip auxiliary relay contacts 23a and the closing relay coil 24.

The circuitry described in connection with the parallel circuits 22, 23a, 24 and 24a, 25 comprises the closing control circuit for the circuit breaker A of Figure 3. This circuit operates in the following manner. When the circuit breaker A is in the open position, the trip auxiliary relay contact 23a will be in the closed position as will hereinafter be more fully described. Thus when an operator wishes to intentionally close the circuit breaker A, the manually closing button 22 is moved to the closed position. Since the lines 20—21 of the circuitry of Figure 1 are connected to the secondary winding 18 of the control power transformer 16, as seen in Figure 3, this circuit voltage will be applied to the circuit even though the circuit breaker A is in the open position. Hence the closing of the manual closing switch 22 will complete an energizing circuit for the closing relay coil 24.

The physical construction of the closing relay coil 24, closing coil 25 and their interaction, is illustrated in co-pending application Serial No. 383,714 filed October 2, 1953, assigned to the assignee of the instant application. The energization of the closing relay coil relay 24 will result in the attraction of its armature to thereby close the closing relay contacts 24a. This operation will complete the energizing circuit for the circuit breaker closing coil 25 to thereby move the plunger to a position whereby it can operate the toggle mechanism of the circuit breaker A to move same to the closed position. As the plunger moves to the closed position, it will unlatch the armature of the closing relay 24 from the relay contacts 24a to thereby prevent pumping operation.

As heretofore noted, the trip auxiliary relay contacts 23a will be maintained in their normally closed position whenever the circuit breaker A is in the open position.

The circuitry, which is energized and operative when the circuit breaker A is open, will now be described. A capacitor charging auto transformer 26 is connected across the main lines 20—21. A circuit breaker tripping capacitor 27 connected in series with a capacitor charging rectifier 28 is connected across the extreme terminals of the capacitor charging auto transformer 26. Hence, during the period of time when the source is energized, the capacitor charging auto transformer 26 will be energized.

Due to the series connection of the tripping capacitor 27 with the rectifier 28, an electric charge will be stored on the tripping capacitor 27. However, when an overcurrent condition exists, the voltage across the lines 20—21 may drop. The tripping capacitor 27 will be discharged through the circuit 29, 23, 30 and 31 when the protective relay contact 29 closes.

It will be noted that, due to the poling of the rectifier 28, the charge stored on the tripping capacitor 27, during the period of energization of the auto transformer 26 when a normal voltage appears across the lines 20—21, will prevent the discharge of the capacitor 27 through the circuit containing the rectifier 28.

Thus, the only alternative path for the discharge of the capacitor 27 will be through the circuit 29, 23, 30 and 31.

The circuit through which the rectifier 27 discharges is comprised of the overcurrent protective device contacts 29, which are normally opened, the trip auxiliary relay operating coil 23, the circuit breaker trip coil 30 and the circuit breaker auxiliary switch contacts 31. The circuit breaker auxiliary switch contacts 31 are closed when the circuit breaker A is in the closed position. These contacts may be operated from the type of auxiliary switch described in Patent No. 2,761,041 issued August 28, 1956, assigned to the assignee of the instant invention.

As clearly seen in Figure 1, it will be necessary for both the contacts 29 and 31 to be closed in order to provide a complete discharge circuit for the tripping capactior 27.

As noted, the normally opened contacts 31, operated from an auxiliary switch of circuit breaker A, will be closed whenever the circuit breaker A is in a closed position.

The contacts 29 will be moved then to a closed position upon the occurrence of a predetermined electrical condition in the circuit being protected by the circuit breaker A. Thus, for example, the secondary winding of a current transformer in a line of power transformer 10 may be connected to an overcurrent relay which will close the protective device contacts 29 on the occurrence of an overcurrent. It should be apparent to those skilled in the art that the protective device 29 can be closed in any desirable manner.

Thus, for example, an inductive or magnetic overcurrent relay or an inductive or magnetic undervoltage relay or a frequency responsive relay may be energized from the protected circuit by an appropriate transformer on the occurrence of a predetermined condition to thereby close the protective device contact 29.

Hence, upon the occurrence of a predetermined condition when the circuit breaker A is in the closed position, both the normally open protective device contacts 29 and the normally open auxiliary switch contacts 31 will be closed.

Prior to this condition, the normally open protective device contacts 29 are opened and hence, neither the trip auxiliary operating coil 23 or circuit breaker trip coil 30 will be energized during the normal operating conditions. However, when the contacts 29 and 31 are closed, due for example to an overcurrent condition, a complete discharge path will be provided for the tripping capacitor 27 through the circuit 29, 23, 30 and 31. Hence, at this time, both the tripping coil 30 and the trip auxiliary relay operating coil 23 will be energized.

Upon the energization of the trip coil 30, the trip latch of the circuit breaker A will be unlatched thereby enabling the opening spring of this circuit breaker to move the main and arcing cooperating contacts from the engaged to the disengaged position to thereby interrupt the circuit between the source 12 and the load 14. When the tripping auxiliary relay operating coil 23 is energized, it will open its associated normally closed contacts 23a and close its normally opened contacts 23b.

The contacts 23b complete an energizing circuit which may be connected to an alarm circuit indicating that circuit breaker A has opened, a trip circuit for a second circuit breaker, a lockout circuit for circuit breaker A or another circuit breaker, or to any other desired circuitry which form no part of my invention.

Thus, as above described, it will now be apparent that the trip auxiliary relay operating coil 23 will be energized when the circuit breaker A is in a closed position and a predetermined condition exists on the line, as for example an overcurrent.

Auxiliary tripping contacts 32 may be connected in parallel with the overcurrent contacts 29 and the trip auxiliary relay operating coil 23. Hence, if it is desired to open the circuit breaker A, even though a predetermined condition, such as an overcurrent does not exist, the tripping contacts 32 can be moved to the closed position, thereby completing a discharge path for the tripping capacitor 27.

Thus, when the trip contacts 32 are closed, the circuit breaker A will be opened due to the energization of the trip coil 30. However, since the circuit breaker opened even though a fault condition does not exist on the line, the trip auxiliary relay operating coil 23 will not be energized and hence its associated contacts 23b will not be closed.

Thus, if this auxiliary circuit in which the contacts 23b are connected provides for the energization of an alarm, the alarm will not operate, and hence there will be no false indication to personnel that the circuit breaker has opened on a fault. However, if the circuit breaker A is opened as a result of a fault condition such as an overcurrent, the tripping capacitor 27 will have discharged through the trip auxiliary relay operating coil 23 and the protective device contacts 29 and thus the contacts 23a and 23b will be respectively opened and closed. In some applications, it will be desirable to have the contacts 23a and 23b respectively opened and closed only during the time that the trip auxiliary relay operating coil 23 is energized. That is, for example, the auxiliary circuit controlled contacts 23b may be connected to indicating or operating means which need be energized only during the opening period of the circuit breaker A.

In this type of connection, the contacts 23a and 23b will be respectively permitted to move to their normally closed and normally open position when the trip auxiliary operating coil 23 is de-energized as a result of the opening of the protective device contacts 29 when the fault condition is removed due to the opening position of the circuit breaker A and due to the opening of the normally open switch 31 which is opened whenever the circuit breaker is moved to the open position.

However, in some instances it may be desirable to have either the contacts 23a or contacts 23b or both remain closed after the circuit breaker A has moved to the open position even though the operating coil 23 has been de-energized.

In this type of situation, latch means, well known in the art, may be provided for the contacts 23a or 23b to maintain same in the open or closed position respectively after the circuit breaker is opened. If, for example, the contacts 23b are latched in the closed position, a reset circuit or hand resetting means must be provided.

Thus, if the requirements of the control scheme are such that the trip auxiliary relay contacts 23b must remain in the operative or closed position for a time longer than that during which the discharge current from tripping capacitor 27 flows through the discharge circuit, a latch type or mechanically held relay is used for the trip auxiliary relay 23. This relay may be hand reset or may be equipped with an electrical reset coil 33 as illustrated in Figure 1.

The reset circuit is comprised of the reset push button or contact 34 connected in series with the trip auxiliary relay reset coil 33. Since this series circuit is connected across the main lines 20—21 which remain energized even though the circuit breaker A is opened, the movement of the reset push button or contacts 34 to the closed position, will complete an energizing circuit for the trip auxiliary reset coil 33. Energization of the reset coil 33 will result in the unlatching of the contacts 23b to thereby reset same to their normally open position.

It will be noted, that the circuitry can be designed so that the reset button 34 is either manually operated, or 34 can be a set of contacts which are automatically operated from an auxiliary circuit. Thus, for example, contacts 34 could be operated from a circuitry energized by the recovery voltage of the main line being protected by the circuit breaker A.

Furthermore, it should be noted, that manual means may be provided to reset the trip auxiliary contacts 23b to the normally open position instead of the reset circuit 33—34.

Thus, it will be noted that with the novel circuitry described and illustrated above in connection with Figure 1, I have provided an arrangement whereby the trip auxiliary relay operating coil 23 remains de-energized during the period of time when the circuit breaker A is closed and normal conditions exist on the line.

With this arrangement whereby the trip auxiliary relay operating coil 23 is connected in series with the trip coil 30 to provide a discharge circuit for the tripping capacitor 27 there will be no possibility of the operation of the trip auxiliary relay operating coil 23 when the voltage in the main line drops. That is, if it is desired that the trip auxiliary relay operating coil 23 operates only on the occurrence of an overcurrent condition, my novel circuit will insure that this operation be maintained and will not permit the energizing of this coil on the occurrence of any other condition on the line such as a drop in line voltage.

Referring now to Figure 2, I have shown a second application of my invention whereby the circuitry of Figure 1 can be utilized to control a transfer circuit for connecting the load to a reserve power source in the event of an undervoltage condition and at the same time provide an overcurrent lockout feature which will prevent transfer to the auxiliary source in the event the main circuit breaker opens as a result of overcurrent conditions.

The components of Figure 2 which are similar to those of Figure 1 contain identical numeral identification. In the circuitry of Figure 2 are shown an overcurrent trip auxiliary relay 23 and an undervoltage trip auxiliary relay 43 with contacts in a transfer circuit. The transfer circuit, rendered operative or inoperative depending upon the conditions causing the tripping of the main circuit breaker, is connected in the closing control circuit of circuit breaker C which in turn connects the auxiliary source 40 to the loads 14. That is, if the main circuit breaker A trips as a result of overcurrent, the closing control circuit of circuit breaker C will be rendered inoperative to thereby prevent the closing of circuit breaker C on a fault.

However, if the main circuit breaker A is opened as a result of an undervoltage condition, the closing circuit for the auxiliary source circuit breaker C will be rendered operative to thereby enable transfer from the source 12 to the auxiliary source 40 for the loads 14. The components of Figure 2, bearing the same numerals as the components of Figure 1, as noted, represent the overcurrent control for the circuit breaker A and function as heretofore described.

Thus, for example, on the occurrence of an overcurrent condition, a magnetic or inductive overcurrent relay will close the protective device contacts 29 to thereby complete an energizing circuit for the overcurrent trip auxiliary relay operating coil 23 and the trip coil 30 from the tripping capacitor 27. When the overcurrent auxiliary trip relay operating coil 23 is energized it will open its normally closed contacts 23aC in the transfer circuit. The transfer circuit in which the contacts 23aC is located, is a portion of a closing control circuit for the auxiliary power circuit breaker C. That is, the auxiliary power circuit breaker C has a closing circuit similar to the circuitry 22, 23a, 24, 24a and 25 described above in connection with the Figure 1.

Since the contacts 23aC are connected in series with the closing relay coil of the circuit breaker C, the opening of these contacts by the overcurrent auxiliary trip relay operating contact 23 will prevent the closing of circuit breaker C on a fault. Since the contacts 23aC are normally closed and connected in series with the normally opened contacts 43b, the auxiliary source 40 for the circuit breaker C can only be closed when the contacts 43b are closed. The contacts 43b are closed on the occurrence of an undervoltage condition in the circuit of circuit breaker A and are operated in a manner now to be described.

An undervoltage circuit is connected in parallel with the overcurrent protective device contact 29 and the overcurrent trip auxiliary relay operating coil 23. This parallel circuit is comprised of the undervoltage protective device contacts 49 and the undervoltage trip auxiliary relay operating coil 43.

When a magnetic or inductive undervoltage relay is energized from the secondary winding 18 of the control power transformer 16, or from a separate transformer similarly connected, the undervoltage protective device contact 49 will be closed on occurrence of voltage failure thereby completing a discharge circuit for the tripping capacitor 27 through the line 20, contacts 49, undervoltage coil 43, trip coil 30 and contacts 31.

Upon energization of the undervoltage trip auxiliary operating relay coil 43, its associated contacts 43a and 43b, respectively, will be opened and closed. That is, the closing control circuit for the circuit breaker A in which the contacts 43a are located, will be opened so that circuit breaker A cannot be closed. However, the contacts 43b in the transfer circuit to circuit breaker C will be closed so that the closing control circuit for the auxiliary power circuit breaker C is either automatically rendered operative or is conditioned so that it will be operative upon the closing of a manual closing button 22, as shown in Figure 1.

The undervoltage auxiliary trip relay contacts may be used to lockout associated breakers by the normally closed contacts 43a or to trip other breakers by the normally open contacts 43b or for alarm or other auxiliary circuits.

As heretofore noted, in connection with the overcurrent trip auxiliary relay 23, the contacts of the relay may or may not be latched to their operative position. In the event that the circuit design requires that they be latched in their operative condition so that they remain in the operative condition after the de-energization of the operating coil, reset circuit 33, 34 is provided, as heretofore described.

In like manner, it may be desirable to latch the contacts 43a and/or 43b in their operative condition following the de-energization of the undervoltage trip auxiliary relay operating coil 43. In this type of case, an electrical reset circuit 53, 54 may be provided. The reset circuit 53, 54 operates in the same manner described above in connection with reset circuit 33, 34 and is capable of having all of the variations noted in connection with the overcurrent reset circuit.

Thus, in summary, it will be noted that with the arrangement of Figure 2, I have provided novel circuitry wherein operation of the main circuit breaker A as a result of overcurrent conditions, will result in the lockout of the transfer circuit to the auxiliary power circuit breaker C and, at the same time, lockout the closing control circuit for the main circuit breaker A.

In the event that the main circuit breaker A is opened as a result of an undervoltage condition, the transfer circuit to the auxiliary circuit breaker C will be rendered operative while at the same time, rendering closing control circuit for the main circuit breaker A inoperative.

Thus the transfer circuit to the auxiliary power breaker C is rendered either operative or inoperative, depending on the nature of the condition which caused the opening of the main circuit breaker A.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. In an electric control circuit for a circuit breaker and a tripping capacitor; said tripping capacitor having a charging and a discharging circuit; said charging circuit connected to the energy source of the circuit breaker with which the electrical control circuit is associated; said discharging circuit comprising a series combination of a normally opened contact, a trip coil, an overcurrent trip auxiliary relay operating coil and a protective device contact; said normally opened contact being closed when said circuit breaker is closed; said protective device contact being closed upon the occurrence of an overcurrent condition in the circuit being protected by said circuit breaker; said normally opened contact and said protective device contact providing a discharge path for said tripping capacitor through said trip coil and said overcurrent trip auxiliary relay operating coil when in closed position; energization of said trip coil effective to automatically open said circuit breaker; second normally opened contacts and second normally closed contacts operatively associated with said overcurrent trip auxiliary relay operating coil; said second normally closed contacts connected in the closing control circuit of said circuit breaker; said second normally open contacts connected in said auxiliary circuit.

2. In an electric control circuit for a circuit breaker and a tripping capacitor; said tripping capacitor having a charging and a discharging circuit; said charging circuit connected to the energy source of the circuit breaker with which the electrical control circuit is associated; said discharging circuit comprising a series combination of a normally opened contact, a trip coil, an overcurrent trip auxiliary relay operating coil and a protective device contact; said normally opened contact being closed when said circuit breaker is closed; said protective device contact being closed upon the occurrence of an overcurrent condition in the circuit being protected by said protective device contact providing a discharge path for said tripping capacitor through said trip coil and said overcurrent trip auxiliary relay operating coil when in closed position; energization of said trip coil effective to automatically open said circuit breaker; second normally opened contacts and second normally closed contacts operatively associated with said overcurrent trip auxiliary relay operating coil; said second normally closed contacts connected in the closing control circuit of said circuit breaker; said second normally open contacts connected in said auxiliary circuit; said trip auxiliary relay operating coil energized only when said circuit breaker is opened as a result of said predetermined condition.

3. In an electric control circuit for a circuit breaker and a tripping capacitor; said tripping capacitor having a charging and a discharging circuit; said charging circuit connected to the energy source of the circuit breaker with which the electrical control circuit is associated; said discharging circuit comprising a series combination of a normally opened contact, a trip coil, an overcurrent trip auxiliary relay operating coil and a protective device contact; said normally opened contact being closed when said circuit breaker is closed; said protective device contact being closed upon the occurrence of an overcurrent condition in the circuit being protected by said circuit breaker; said normally opened contact and said protective device contact providing a discharge path for said tripping capacitor through said trip coil and said overcurrent trip auxiliary relay operating coil when in closed position; energization of said trip coil effective to automatically open said circuit breaker; second normally opened contacts and second normally closed contacts operatively associated with said overcurrent trip auxiliary relay operating coil; said second normally closed contacts connected in the closing control circuit of said circuit breaker; said second normally open contacts connected in said auxiliary circuit; normally open means connected in parallel with said protective device contacts and said auxiliary trip auxiliary relay operating coil; said normally open means effective to open said circuit breaker without the occurrence of said predetermined condition; said normally open means effective to render said auxiliary circuit inoperative.

4. In an electric control circuit for a circuit breaker and a tripping capacitor; said tripping capacitor having a charging and a discharging circuit; said charging circuit connected to the energy source of the circuit breaker with which the electrical control circuit is associated; said discharging circuit comprising a series combination of a normally opened contact, a trip coil, an overcurrent trip auxiliary relay operating coil and a protective device contact; said normally opened contact being closed when said circuit breaker is closed; said protective device contact being closed upon the occurrence of an overcurrent condition in the circuit being protected by said circuit breaker; said normally opened contact and said protective device contact providing a discharge path for said tripping capacitor through said trip coil and said overcurrent trip auxiliary relay operating coil when in closed position; energization of said trip coil effective to automatically open said circuit breaker; second normally opened contacts and second normally closed contacts operatively associated with said overcurrent trip auxiliary relay operating coil; said second normally closed contacts connected in the closing control circuit of said circuit breaker; said second normally open contacts connected in said auxiliary circuit; means to maintain said normally open and said normally closed contact in their operated position following deenergization of trip auxiliary relay operating coil; a reset circuit to move said second normally open and second normally closed contacts to their normal position from their operated position.

5. In an electric control circuit for a circuit breaker and a tripping capacitor; said tripping capacitor having a charging and a discharging circuit; said charging circuit connected to the energy source of the circuit breaker with which the electrical control circuit is associated; said discharging circuit comprising a series combination of a normally opened contact; a trip coil and a protective device contact; said normally opened contact being closed when said circuit breaker is closed; said protective device contact being closed upon the occurrence of an overcurrent condition in the circuit being protected by said circuit breaker; energization of said trip coil effective to automatically open said circuit breaker; an undervoltage protective device contact and an undervoltage trip auxiliary relay operating coil connected in series with each other and in parallel with said overcurrent protective device contact and said overcurrent trip auxiliary relay operating coil; said undervoltage protective device contact closed on the occurrence of an undervoltage condition in the circuit being protected by said circuit breaker; said undervoltage trip auxiliary relay operating coil joining an alternative discharge path for said trip capacitor when said undervoltage protective device contact is closed; a second normally closed contact operable by said overcurrent trip auxiliary relay operating coil and a second normally opened contact operable by said undervoltage trip auxiliary relay operating coil; said second normally opened and normally closed contacts being connected in series to form part of a transfer circuit.

6. In an electric control circuit for a circuit breaker and a tripping capacitor; said tripping capacitor having a charging and a discharging circuit; said charging circuit connected to the energy source of the circuit breaker with which the electrical control circuit is associated; said discharging circuit comprising a series combination of a normally opened contact, a trip coil, an overcurrent trip auxiliary relay operating coil and a protective device contact; said normally opened contact being closed when said circuit breaker is closed; said protective device contact being closed upon the occurrence of an overcurrent condition in the circuit being protected by said circuit breaker; said normally opened contact and said protective device contact providing a discharge path for said tripping capacitor through said trip coil and said overcurrent trip auxiliary relay operating coil when in closed position; energization of said trip coil effective to automatically open said circuit breaker, energization of said overcurrent trip auxiliary relay operating coil effective to render an auxiliary circuit of said circuit breaker operative; said trip auxiliary relay control coil energized only on the occurrence of said predetermined condition; an undervoltage protective device contact and an undervoltage trip auxiliary relay operating coil connected in series with each other and in parallel with said overcurrent protective device contact and said overcurrent trip auxiliary relay operating coil; said undervoltage protective device contact closed on the occurrence of an undervoltage condition in the circuit being protected by said circuit breaker, said undervoltage trip auxiliary relay operating coil joining an alternative discharge path for said trip capacitor when said undervoltage protective device contact is closed; a second normally closed contact operable by said overcurrent trip auxiliary relay operating coil and a second normally opened contact operable by said undervoltage trip auxiliary relay operating coil; said second normally opened and normally closed contacts being connected in series to form part of a transfer circuit.

7. In an electric control circuit for a circuit breaker and a tripping capacitor; said tripping capacitor having a charging and a discharging circuit; said charging circuit connected to the energy source of the circuit breaker with which the electrical control circuit is associated; said discharging circuit comprising a series combination of a normally opened contact, a trip coil, an overcurrent trip auxiliary relay operating coil and an overcurrent protective device contact; said normally opened contact being closed when said circuit breaker is closed; said overcurrent protective device contact being closed upon the occurrence of an overcurrent condition in the circuit being protected by said circuit breaker; said normally opened contact and said protective device contact providing a discharge path for said tripping capacitor through said trip coil and said overcurrent trip auxiliary relay operating coil when in closed position; energization of said trip coil effective to automatically open said circuit breaker; energization of said overcurrent trip auxiliary relay operating coil effective to render an auxiliary circuit of said circuit breaker operative; an undervoltage protective device contact and an undervoltage trip auxiliary relay operating coil connected in series with each other and in parallel with the series circuit of said overcurrent protective device contact and said overcurrent trip auxiliary relay operating coil, said undervoltage protective device contact closed on the occurrence of an undervoltage condition in the circuit being protected by said circuit breaker, said undervoltage trip auxiliary relay operating coil joining an alternative discharge path for said trip capacitor when said undervoltage protective device contact is closed; at least one set of latchable contacts associated with each of said undercurrent and undervoltage trip auxiliary operating coils and operable thereby; a reset means to move said sets of latchable contacts to their normal position from their operated position.

8. In an electric control circuit for a circuit breaker and a tripping capacitor; said tripping capacitor having a charging and a discharging circuit; said charging circuit connected to the energy source of the circuit breaker with which the electrical control circuit is associated; said discharging circuit comprising a series combination of a normally opened contact, a trip coil, an overcurrent trip auxiliary relay operating coil and a protective device contact; said normally opened contact being closed when said circuit breaker is closed; said protective device contact being closed upon the occurrence of an overcurrent condition in the circuit being protected by said circuit breaker; said normally opened contact and said protective device contact providing a discharge path for said tripping capacitor through said trip coil and said overcurrent trip auxiliary relay operating coil when in closed position; energization of said trip coil effective to automatically open said circuit breaker, energization of said overcurrent trip auxiliary relay operating coil effective to render an auxiliary circuit of said circuit breaker operative; an under-voltage protective device contact and an under-voltage trip auxiliary relay operating coil connected in series with each other and in parallel with said overcurrent protective device contact and said overcurrent trip auxiliary relay operating coil, said undervoltage protective device contact closed on the occurrence of an undervoltage condition in the circuit being protected, by said circuit breaker, said undervoltage trip auxiliary relay operating coil joining an alternative discharge path for said trip capacitor when said undervoltage protective device contact is closed; a second normally closed contact operable by said overcurrent trip auxiliary relay operating coil and a second normally opened contact operable by said undervoltage trip auxiliary relay operating coil; said second normally opened and normally closed contacts being connected in series to form part of a transfer circuit.

9. In an electric control circuit for a circuit breaker and a tripping capacitor; said tripping capacitor having a charging and a discharging circuit; said charging circuit connected to the energy source of the circuit breaker with which the electrical control circuit is associated; said discharging circuit comprising a series combination of a normally opened contact, a trip coil, an overcurrent trip auxiliary relay operating coil and a protective device contact; said normally opened contact being closed when said circuit breaker is closed; said protective device contact being closed upon the occurrence of an overcurrent condition in the circuit being protected by said circuit breaker; said normally opened contact and said protective device contact providing a discharge path for said tripping capacitor through said trip coil and said overcurrent trip auxiliary relay operating coil when in closed position; energization of said trip coil effective to automatically open said circuit breaker, energization of said overcurrent trip auxiliary relay operating coil effective to render an auxiliary circuit of said circuit breaker operative; an under-voltage protective device contact and an under-voltage trip auxiliary relay operating coil connected in series with each other and in parallel with said overcurrent protective device contact and said overcurrent trip auxiliary relay operating coil, said undervoltage protective device contact closed on the occurrence of an undervoltage condition in the circuit being protected, by said circuit breaker, said undervoltage auxiliary relay operating coil joining an alternative discharge path for said trip capacitor when said undervoltage protective device contact is closed; said overcurrent trip auxiliary relay operating coil having a first and second normally closed contact associated therewith; said undervoltage trip auxiliary relay operating coil having a normally open and a normally closed contact associated therewith and operated thereby, said first normally closed contact and said undervoltage normally closed contact connected in series in the closing control circuit of said main circuit breaker; said second normally closed contact and said second normally open contact connected in series in a transfer circuit to the closing operating circuit of an auxiliary source circuit breaker; operation of said main circuit breaker as a result of an overcurrent condition effective to render said closing control circuit of said main circuit breaker and said auxiliary circuit breaker ineffective as a result of the opening of said first normally closed contact and said overcurrent normally closed contact.

References Cited in the file of this patent

UNITED STATES PATENTS

| | | |
|---|---|---|
| 2,280,945 | Gamel | Apr. 28, 1942 |
| 2,381,254 | Bonine | Aug. 7, 1945 |
| 2,486,305 | Mahnke | Oct. 25, 1949 |